(12) United States Patent
Fu et al.

(10) Patent No.: US 9,286,660 B2
(45) Date of Patent: Mar. 15, 2016

(54) FILTERING METHOD AND DEVICE IN IMAGE PROCESSING

(71) Applicant: Fujitsu Limited, Kawasaki-shi (JP)

(72) Inventors: Xuan Fu, Beijing (CN); Jiangli Ye, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 14/298,160

(22) Filed: Jun. 6, 2014

(65) Prior Publication Data

US 2014/0363080 A1    Dec. 11, 2014

(30) Foreign Application Priority Data

Jun. 8, 2013 (CN) .......................... 2013 1 0227302

(51) Int. Cl.
G06K 9/40 (2006.01)
G06T 5/00 (2006.01)
G06T 5/40 (2006.01)
H04N 1/62 (2006.01)

(52) U.S. Cl.
CPC . G06T 5/002 (2013.01); G06T 5/40 (2013.01); H04N 1/62 (2013.01); G06T 2207/20012 (2013.01); G06T 2207/20021 (2013.01); G06T 2207/20024 (2013.01)

(58) Field of Classification Search
None
See application file for complete search history.

(56) References Cited

U.S. PATENT DOCUMENTS

2010/0040305 A1* 2/2010 Kim .............................. 382/266
2011/0169686 A1* 7/2011 Eusebi Borzelli et al. . 342/25 A

OTHER PUBLICATIONS

Hagg, Wilhelm, and Manfred Sties. "Efficient speckle filtering of SAR images." Geoscience and Remote Sensing Symposium, 1994. IGARSS'94. Surface and Atmospheric Remote Sensing: Technologies, Data Analysis and Interpretation., International. vol. 4. IEEE, 1994.*
W. Hagg et al., "Efficient Speckle Filtering of SAR Images," *Proceedings of the International Geoscience and Remote Sensing Symposium*, vol. 4, Aug. 8, 1994, pp. 2140-2142.
X. Li et al., "A Novel Speckle Filtering Technique for SAR Image," *Proceedings of the $6^{th}$ International Conference on Signal Processing*, vol. 1, Aug. 26, 2002, pp. 788-791.
Extended European Search Report mailed Mar. 2, 2015 for corresponding European Patent Application No. 14170903.0.

* cited by examiner

*Primary Examiner* — Andrew Moyer
(74) *Attorney, Agent, or Firm* — Staas & Halsey LLP

(57) ABSTRACT

Embodiments provide a filtering method and device in image processing. The device includes: a dividing unit to divide a first filtering window into blocks; a determining unit to determine a filtering window area according to relevance between a central block and other non-central blocks in the blocks; and a filtering unit to perform filtering processing on an image in the determined filtering window area. With the method and device of the embodiments, a boundary of an object will not be crossed in filtering, and in removing noise, information on other objects will not be introduced to affect the result of filtering. A filtering window size may be determined while filtering is performing, which may be carried out in one path, avoiding time delay resulting from execution of two paths of a conventional method where an edge is detected and then the size of a filtering window is determined.

18 Claims, 3 Drawing Sheets

---

301 calculating a relevance parameter of each of the plurality of blocks

302 comparing a relevance parameter of each of the non-central blocks in a predetermined direction of the central block with a relevance parameter of the central block to determine whether the non-central blocks are related to the central block

303 excluding non-central blocks of the rows and/or columns where boundary blocks are located and their peripheral non-central blocks from a range of the filtering window area by taking non-central blocks unrelated to the central block as the boundary blocks ● current pixel

301
calculating a relevance parameter of each of the plurality of blocks

302
comparing a relevance parameter of each of the non-central blocks in a predetermined direction of the central block with a relevance parameter of the central block to determine whether the non-central blocks are related to the central block

303
excluding non-central blocks of the rows and/or columns where boundary blocks are located and their peripheral non-central blocks from a range of the filtering window area by taking non-central blocks unrelated to the central block as the boundary blocks

FIG.3

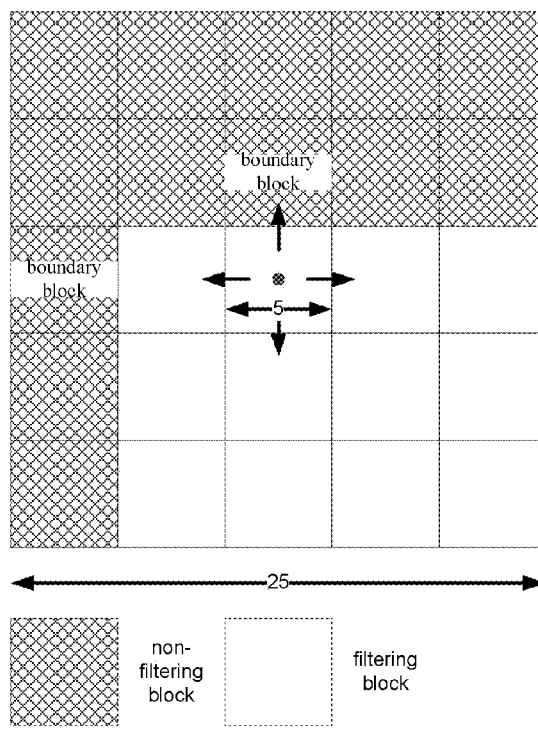

FIG.4

FILTERING METHOD AND DEVICE IN IMAGE PROCESSING

CROSS REFERENCE TO RELATED APPLICATIONS

This application claims the benefit of Chinese Application No. 201310227302.8, filed Jun. 8, 2013, the disclosure of which is incorporated herein by reference.

TECHNICAL FIELD

The present invention relates to the field of image processing, and in particular to a filtering method and device in image processing.

BACKGROUND ART

In digital image processing, different kinds of filters are widely used for noise reduction and enhancement, etc. Usually, filter is of fixed window size, such as 5×5, 9×9 or 15×15, etc. The realization of a fixed window size is easy, but when an object boundary is met, the fixed window size will contain all pixels of two or more different objects, which results in that a filtering result is undesired.

In order to solve this problem, one method is to perform edge detection to an image first, and then determine a filtering window of a filter by using the result of the edge detection. However, the method needs to be carried out in two paths, which results in relatively long time delay, and is not well suitable for some applications having a strict requirement on time delay.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of present invention is to provide a filtering method and device in image processing, so as to determine a filtering window area in one path, and perform image filtering processing according to the determined filtering window area.

The above object of the present invention is achieved by a technical solution as follows.

A filtering device, comprising:
a dividing unit configured to divide a first filtering window into a plurality of blocks;
a determining unit configured to determine a filtering window area according to relevance between a central block and other non-central blocks in the plurality of blocks; and
a filtering unit configured to perform filtering processing on an image in the determined filtering window area.

A filtering method, comprising:
a dividing step: dividing a first filtering window into a plurality of blocks;
a determining step: determining a filtering window area according to relevance between a central block and other non-central blocks in the plurality of blocks; and
a filtering step: performing filtering processing on an image in the determined filtering window area.

The advantage of the embodiments of the present invention resides in that a boundary of an object will not be crossed in filtering, and in removing noise, information on other objects will not be introduced to affect the result of filtering. And the size of a filtering window may be determined while filtering is performing, which may be carried out in one path, thereby avoiding time delay resulted from execution of two paths of a conventional method where an edge is detected first and then the size of a filtering window is determined.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

In the drawings:
FIG. 3 is a flowchart of determining relevance in the filtering method of the embodiment of the present invention;
FIG. 4 is a schematic diagram of an effective filtering window area determined according to the filtering method of the embodiment of the present invention.

DETAILED DESCRIPTION OF THE INVENTION

Foregoing and other features of the embodiments of the present invention will become apparent with reference to the drawings and the following description. These embodiments are illustrative only and are not intended to limit the present invention.

Figure 1:
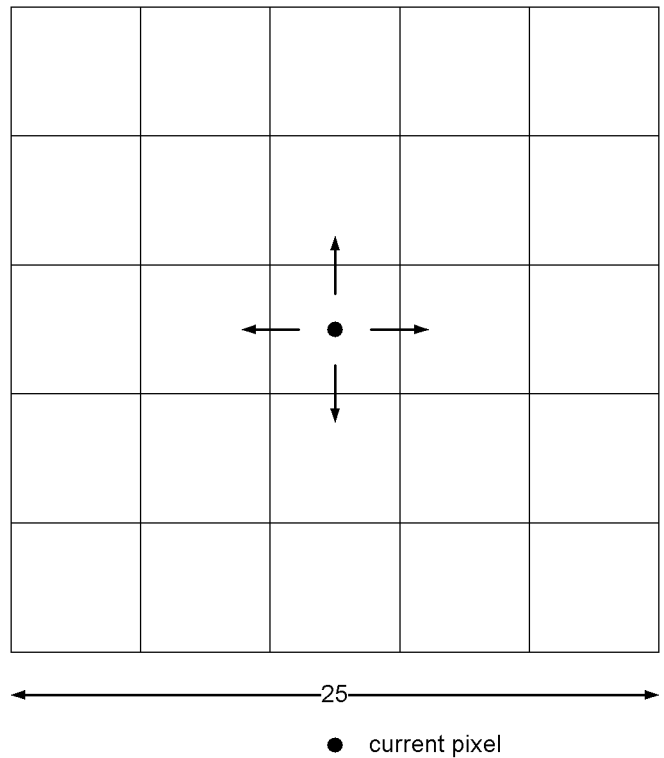
FIG. 1 is a schematic diagram of a first filtering window with the window size being 25×25.

For easy understanding of the principle and embodiments of the present invention by those skilled in the art, the embodiments of the present invention shall be described taking a maximum possible filtering window with the window size being 25×25 shown in FIG. 1 as an example. However, it should be understood that the embodiments of the present invention are not limited to the filtering window of the above size, and are applicable to maximum possible filtering windows of other sizes.

For the convenience of explanation, in the embodiments of the present invention, a maximum possible filtering window is referred to as a first filtering window. Hence, the embodiments of the present invention are to determine an effective filtering window area based on the first filtering window, and then to perform filtering processing.

Preferred embodiments of the present invention shall be described below with reference to the accompanying drawings.

Embodiment 1

Figure 2:
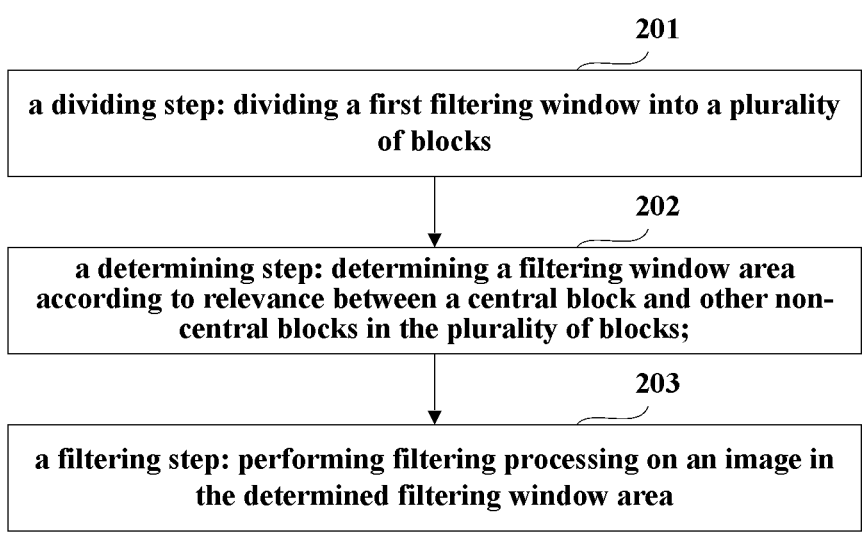
FIG. 2 is a flowchart of a filtering method of an embodiment of the present invention.

An embodiment of the present invention provides a filtering method. FIG. 2 is a flowchart of the method. Referring to FIG. 2, the method includes the steps of:

step 201: a dividing step: dividing a first filtering window into a plurality of blocks;

step 202: a determining step: determining a filtering window area according to relevance between a central block and other non-central blocks in the plurality of blocks; and step 203: a filtering step: performing filtering processing on an image in the determined filtering window area.

In step 201, the first filtering window is a maximum possible filtering window, the size of which being 25×25, as shown in FIG. 1. Currently, the whole area of the first filtering window is taken as a filtering area for performing filtering processing on an image; however, the problem pointed out in the Background Art exists in such a filtering method. In this embodiment, in order to overcome such a problem, the first filtering window is divided into a plurality of blocks first.

In step 201, the plurality of blocks may be of N×N arrangement, and may also be of N×M arrangement, N and M being non-zero natural numbers. For example, the 25×25 filtering window shown in FIG. 1 is divided into twenty-five 5×5 small filtering windows. For the convenience of explanation, a small filtering window is referred to as a block in this embodiment.

In step 201, two neighboring blocks may be overlapped each other, that is, two neighboring blocks may have an overlapped area; and they may also not be overlapped each other, that is, two neighboring blocks may have no overlapped area. Of course, overlapping relationship between all the neighboring blocks are not limited in this embodiment, that is, some of the neighboring blocks may be overlapped each other, and other neighboring blocks may not be overlapped. FIG. 1 shows a case where the twenty-five 5×5 small filtering windows are not overlapped each other.

In step 202, the effective filtering window area may be determined by calculating some relevance-related parameters (referred to as relevance parameters, for the convenience of explanation) of the small filtering windows for each of the divided small filtering windows, and comparing relevance of the non-central blocks and the central block. FIG. 3 is a flowchart of the method of step 202. Referring to FIG. 3, the method includes:

step 301: calculating a relevance parameter of each of the plurality of blocks;

step 302: comparing a relevance parameter of each of the non-central blocks in a predetermined direction of the central block with a relevance parameter of the central block to determine whether the non-central blocks are related to the central block; and step 303: excluding non-central blocks of the rows and/or columns where boundary blocks are located and their peripheral non-central blocks from a range of the filtering window area by taking non-central blocks unrelated to the central block as the boundary blocks.

In step 301, a relevance parameter of each block (each small filtering window) is calculated first, the relevance parameter may be a mean value, standard variance, histogram distribution, a sum of luminance weights of pixels, and a sum of color weights of pixels, etc. However, the embodiments of the present invention are not limited thereto, and all relevance-related parameters are covered by the protection scope of the relevance parameter of this embodiment.

In step 302, after the relevance parameter of each block is calculated in step 301, relevance between the non-central blocks and the central block is determined by comparing the relevance parameters of the non-central blocks with the relevance parameter of the central block, and thereby an effective filtering window area may be determined.

In this embodiment, the comparison of the relevance parameters of the non-central blocks and the central block may be performed outwards from the central block in a predetermined direction of the central block. The predetermined direction may be four directions, the upper, the lower, the left and the right, of the central block, may be four directions, the upper right, the upper left, the lower left and the lower right, of the central block, or may be four directions, the upper, the lower, the left and the right, of the central block, and four directions, the upper right, the upper left, the lower left and the lower right, of the central block.

The method for determining whether the non-central blocks are related to the central block in step 302 of this embodiment shall be described below taking different relevance parameters as examples.

In a mode of implementation, the relevance parameter is a mean value, for example, a mean value of luminance values of all the pixels, or other chromaticity Cb or Cr, or R, G, B, etc., and this embodiment is not limited thereto. Whether a non-central block is related to the central block is determined by comparing a mean value of the non-central block with a mean value of the central block. It is determined that a non-central block is unrelated to the central block if an absolute value of a difference between the mean value of the non-central block and the mean value of the central block is greater than a predefined threshold value (referred to as a first threshold value, for the convenience of explanation); otherwise, it is determined that they are related.

In another mode of implementation, the relevance parameter is standard deviation, which indicates distribution of values of pixels in each block, with small deviation showing that they are relatively centralized, and large deviation showing that they are relatively dispersed. Whether a non-central block is related to the central block is determined by comparing standard deviation of the non-central block with standard deviation of the central block. It is determined that a non-central block is unrelated to the central block if a difference between the standard deviation of the non-central block and the standard deviation of the central block is greater than a predefined threshold value (referred to as a second threshold value, for the convenience of explanation); otherwise, it is determined that they are related.

In still another mode of implementation, the relevance parameter is histogram distribution. Whether a non-central block is related to the central block is determined by comparing histogram distribution of the non-central block with histogram distribution of the central block. It is determined that a non-central block is unrelated to the central block if the histogram distribution of the non-central block is different from the histogram distribution of the central block; otherwise, it is determined that they are related.

In further still another mode of implementation, the relevance parameter is a sum of luminance weights of pixels. Whether a non-central block is related to the central block is determined by comparing the sum of luminance weights of all the pixels of the non-central block with the sum of luminance weights of all the pixels of the central block. It is determined that a non-central block is related to the central block if the sum of luminance weights of all the pixels of the non-central block and the sum of luminance weights of all the pixels of the central block satisfy following relation; otherwise, it is determined that they are unrelated.

$b*\text{SUM}(W_Y(x,y))$ of the central block$<\text{SUM}(W_Y(x,y))$ of the non-central block$<c*\text{SUM}(W_Y(x,y))$ of the central block;

where, $W_Y(x, y)$ denotes a luminance weight of a pixel at a position (x,y), and $\text{SUM}(W_Y(x, y))$ denotes the sum of the luminance weights $W_Y(x, y)$ of all the pixels in the central block or the non-central block; and where, b and c are both proportion coefficients, b is less than or equal to 1, and c is greater than or equal to 1; a typical value of b may be for example 0.1, 0.25, 0.5, and 0.75, etc., and a typical value of c may be for example 1.2, 1.25, 1.5, and 2, etc.

In this embodiment, $W_Y(x, y)$ may be obtained through calculation by using formula (1) below, and may also be obtained through calculation by using formula (2) below:

$$W_Y(x, y) = e^{-\frac{D_Y^2}{sigma\_e^2}}, \quad (1)$$

$$W_Y(x, y) = \begin{cases} \left(1 - \frac{D_Y}{th_{e\_Y}}\right)^a & D_Y < th_{e\_Y} \\ 0 & \text{otherwise,} \end{cases} \quad (2)$$

where, $D_y$ denotes an absolute value of a luminance difference between a detected pixel and a current pixel, $th_{e\_Y}$ denotes a threshold value of a luminance difference, and a denotes a parameter related to a characteristic of a noise curve; and a value of a may be predefined, and may also be determined adaptively; preferably, a value of a when a noise curve of a bright block being steep is greater than that of a when a noise curve of a dark block being gradual.

In yet still another mode of implementation, the relevance parameter is a sum of color weights of pixels. Whether a non-central block is related to the central block is determined by comparing the sum of color weights of all the pixels of the non-central block with the sum of color weights of all the pixels of the central block. It is determined that a non-central block is related to the central block if the sum of color weights of all the pixels of the non-central block and the sum of color weights of all the pixels of the central block satisfy following relation; otherwise, it is determined that they are unrelated.

$b*\text{SUM}(W_C(x,y))$ of the central block$<\text{SUM}(W_C(x,y))$ of the non-central block$<c*\text{SUM}(W_C(x,y))$ of the central block;

where, $W_C(x, y)$ denotes a color weight of a pixel at a position (x,y), and $\text{SUM}(W_C(x, y))$ denotes the sum of the color weights $W_C(x, y)$ of all the pixels in the central block or the non-central block; and where, b and c are both proportion coefficients, b is less than or equal to 1, and c is greater than or equal to 1; a typical value of b may be for example 0.1, 0.25, 0.5, and 0.75, etc., and a typical value of c may be for example 1.2, 1.25, 1.5, and 2, etc.

In this embodiment, $W_C(x,y)$ may be $W_{Cb}(x,y)$, that is, a weighted value of blue of a pixel at a position (x,y), and $W_{Cb}(x,y)$ may be obtained through calculation by using formula (3) below, and may also be obtained through calculation by using formula (4) below:

$$W_{Cb}(x, y) = e^{-\frac{D_{Cb}^2}{sigma\_e^2}}, \quad (3)$$

$$W_{Cb}(x, y) = \begin{cases} \left(1 - \frac{D_{Cb}}{th_{e\_Cb}}\right)^d & D_{Cb} < th_{e\_Cb} \\ 0 & \text{otherwise,} \end{cases} \quad (4)$$

where, $D_{Cb}$ is a Cb chromaticity difference between a detected pixel and a current pixel, and $th_{e\_Cb}$ is a threshold value of a Cb chromaticity difference, d denoting a parameter related to a noise characteristic.

In this mode of implementation, Wc(x,y) may be $W_{Cr}(x,y)$, that is, a weighted value of red of a pixel at a position (x,y), and $W_{Cr}(x,y)$ may be obtained through calculation by using formula (5) below, and may also be obtained through calculation by using formula (6) below:

$$W_{Cr}(x, y) = e^{-\frac{D_{Cr}^2}{sigma\_e^2}}, \quad (5)$$

$$W_{Cr}(x, y) = \begin{cases} \left(1 - \frac{D_{Cr}}{th_{e\_Cr}}\right)^d & D_{Cr} < th_{e\_Cr} \\ 0 & \text{otherwise} \end{cases} \quad (6)$$

where, $D_{Cr}$ is a Cr chromaticity difference between a detected pixel and a current pixel, and $th_{e\_Cr}$ is a threshold value of a Cr chromaticity difference, d denoting a parameter related to a noise characteristic.

The above modes of implementation are described for determining relevance between the non-central blocks and the central block in step 302 taking relatively frequently used relevance-related parameters as examples. However, as described above, the embodiment of the present invention is not limited to the above relevance parameters, nor to the above manners of comparison.

In step 303, after the non-central blocks related to the central block are determined in step 302, an effective filtering window area may be determined accordingly.

In this embodiment, non-central blocks unrelated to the central block may be taken as boundary blocks, and non-central blocks of the rows and/or columns where the boundary blocks are located and their peripheral non-central blocks may be excluded from a range of the filtering window area, and a specific area constituted by all the non-central blocks related to the central block is taken as a filtering window area.

In a mode of implementation, if the non-central blocks related to the central block are located in the four directions, the upper, the lower, the left and the right, of the central block, a rectangular area constituted by all the non-central blocks related to the central block is taken as the filtering window area.

In another mode of implementation, if the non-central blocks related to the central block are located in the four directions, the upper left, the upper right, the lower left and/or the lower right, of the central block, a triangular area constituted by all the non-central blocks related to the central block is taken as the filtering window area.

In still another mode of implementation, if the non-central blocks related to the central block are located in at least one of the four directions, the upper, the lower, the left and the right, of the central block, and in at least one of the four directions, the upper left, the upper right, the lower left and/or the lower right, of the central block, a triangular area constituted by all the non-central blocks related to the central block is taken as the filtering window area. Preferably, if areas exceeding a predefined proportion in a non-central block fall within the triangular area, the non-central block is added into the filtering window area.

In this embodiment, the central block refers to a block where a filtering center is located, that is, the small filtering window where the filtering center is located after the first filtering window is divided.

FIG. 4 is a schematic diagram of an filtering window area determined according to the method of the embodiment of the present invention. As shown in FIG. 4, a final effective filtering window area is constituted by a 4×3 rectangular area.

With the method of the embodiment of the present invention, a boundary of an object will not be crossed in filtering, and in removing noise, information on other objects will not be introduced to affect the result of filtering. And the size of a filtering window may be determined while filtering is performing, which may be carried out in one path, thereby avoiding time delay resulted from execution of two paths of a conventional method where an edge is detected first and then the size of a filtering window is determined.

An embodiment of the present invention further provides a filtering device, as described in Embodiment 2 below. As the principle of the filtering device for solving problem is similar to that of the method in Embodiment 1, the implementation of the method may be referred to for the implementation of the filtering device, and the identical parts shall not be described any further.

Embodiment 2

Figure 5:
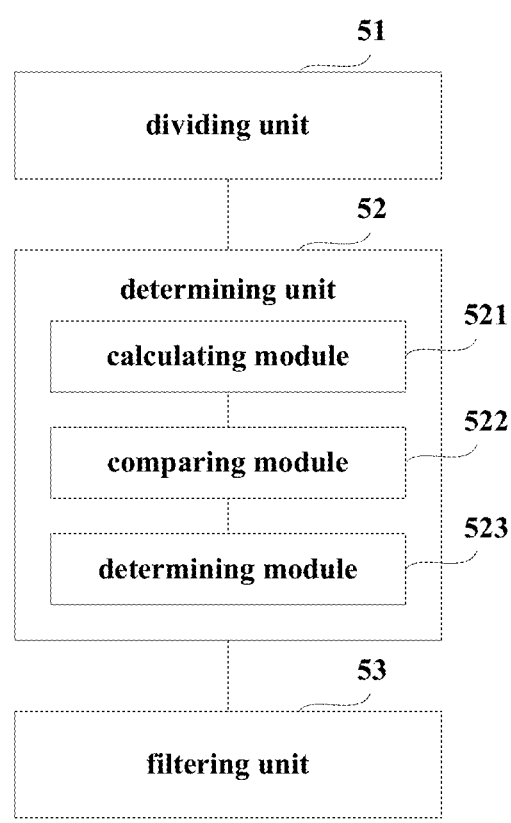
FIG. 5 is a schematic diagram of the structure of a filtering device of an embodiment of the present invention.

An embodiment of the present invention further provides a filtering device. FIG. 5 is a schematic diagram of the structure of the filtering device. Referring to FIG. 5, the filtering device includes:

a dividing unit 51 configured to divide a first filtering window into a plurality of blocks;

a determining unit 52 configured to determine a filtering window area according to relevance between a central block and other non-central blocks in the plurality of blocks; and a filtering unit 53 configured to perform filtering processing on an image in the determined filtering window area.

The plurality of blocks may be of N×N arrangement, and may also be of N×M arrangement, N and M being non-zero natural numbers.

In the plurality of blocks, two neighboring blocks may have an overlapped area, or, two neighboring blocks may have no overlapped area.

In an embodiment, the determining unit 52 includes:

a calculating module 521 configured to calculate a relevance parameter of each of the plurality of blocks;

a comparing module 522 configured to compare a relevance parameter of each of the non-central blocks in a predetermined direction of the central block with a relevance parameter of the central block according to the result of calculation of the calculating module; and a determining module 523 configured to determine whether the non-central blocks are related to the central block according to the result of comparison of the comparing module, and excluding non-central blocks of the rows and/or columns where boundary blocks are located and their peripheral non-central blocks from a range of the filtering window area by taking non-central blocks unrelated to the central block as the boundary blocks.

The predetermined direction may include four directions, the upper, the lower, the left and the right, of the central block, or the predetermined direction may include four directions, the upper right, the upper left, the lower left and the lower right, of the central block, or the predetermined direction may include four directions, the upper, the lower, the left and the right, of the central block, and four directions, the upper right, the upper left, the lower left and the lower right, of the central block.

If non-central blocks related to the central block are located in the four directions, the upper, the lower, the left and/or the right, of the central block, a rectangular area constituted by all the non-central blocks related to the central block is taken as the filtering window area.

If non-central blocks related to the central block are located in the four directions, the upper left, the upper right, the lower left and/or the lower right, of the central block, a triangular area constituted by all the non-central blocks related to the central block is taken as the filtering window area.

If non-central blocks related to the central block are located in at least one of the four directions, the upper, the lower, the left and the right, of the central block, and in at least one of the four directions, the upper left, the upper right, the lower left and/or the lower right, of the central block, a triangular area constituted by all the non-central blocks related to the central block is taken as the filtering window area. And if areas exceeding a predefined proportion in a non-central block fall within the triangular area, the non-central block is added into the filtering window area.

In a mode of implementation, the relevance parameter is a mean value, the comparing module 522 compares a mean value of each of the non-central blocks in the predetermined direction of the central block with a mean value of the central block, and the determining module 523 determines that a non-central block is unrelated to the central block if an absolute value of a difference between the mean value of the non-central block and the mean value of the central block is greater than a first threshold value.

In a mode of implementation, the relevance parameter is standard deviation, the comparing module 522 compares standard deviation of each of the non-central blocks with standard deviation of the central block, and the determining module 523 determines that a non-central block is unrelated to the central block if a difference between the standard deviation of the non-central block and the standard deviation of the central block is greater than a second threshold value.

In a mode of implementation, the relevance parameter is histogram distribution, the comparing module 522 compares histogram distribution of each of the non-central blocks with histogram distribution of the central block, and the determining module 523 determines that a non-central block is unrelated to the central block if the histogram distribution of the non-central block is different from the histogram distribution of the central block.

In a mode of implementation, the relevance parameter is a sum of luminance weights of pixels, the comparing module 522 compares the sum of luminance weights of all the pixels of each of the non-central blocks with the sum of luminance weights of all the pixels of the central block to determine whether following relation is satisfied: $b*SUM(W_y(x, y))$ of the central block $< SUM(W_y(x, y))$ of a non-central block $< c*SUM(W_y(x, y))$ of the central block; where, $W_y(x, y)$ denotes a luminance weight of a pixel at a position (x,y), and SUM($W_Y$(x, y)) denotes the sum of the luminance weights $W_Y$(x, y) of all the pixels in the central block or the non-central block; where, b and c are both proportion coefficients, b is less than or equal to 1, and c is greater than or equal to 1; and the determining module 523 determines that the non-central block is related to the central block if the result of comparison of the comparing module is that the above relation is satisfied; otherwise, the determining module 523 determines that the non-central block is unrelated to the central block.

In this mode of implementation, the comparing module 522 may calculate $W_Y$(x, y) by using formula (1) or (2) below:

$$W_Y(x, y) = e^{-\frac{D_Y^2}{sigma\_e^2}}, \quad (1)$$

$$W_Y(x, y) = \begin{cases} \left(1 - \frac{D_Y}{th_{e\_Y}}\right)^a & D_Y < th_{e\_Y} \\ 0 & \text{otherwise,} \end{cases} \quad (2)$$

where, $D_y$ denotes an absolute value of a luminance difference between a detected pixel and a current pixel, $th_{e\_Y}$ denotes a threshold value of a luminance difference, and a denotes a parameter related to a characteristic of a noise curve.

In a mode of implementation, the relevance parameter is a sum of color weights of pixels, the comparing module 522 compares the sum of color weights of all the pixels of each of the non-central blocks with the sum of color weights of all the pixels of the central block to determine whether following relation is satisfied: b*SUM($W_C$(x, y)) of the central block<SUM($W_C$(x, y)) of a non-central block<c*SUM($W_C$(x, y)) of the central block; where, $W_C$(x, y) denotes a color weight of a pixel at a position (x, y), and SUM($W_C$(x, y)) denotes the sum of the color weights $W_C$(x, y) of all the pixels in the central block or the non-central block; where, b and c are both proportion coefficients, b is less than or equal to 1, and c is greater than or equal to 1; and the determining module 523 determines that a non-central block is related to the central block if the result of comparison of the comparing module 522 is that the above relation is satisfied; otherwise, the determining module 523 determines that the non-central block is unrelated to the central block.

In this mode of implementation, $W_C$(x,y) may be $W_{Cb}$(x, y), and the comparing module 522 may calculate $W_{Cb}$(x,y) by using formula (3) or (4) below:

$$W_{Cb}(x, y) = e^{-\frac{D_{Cb}^2}{sigma\_e^2}}, \quad (3)$$

$$W_{Cb}(x, y) = \begin{cases} \left(1 - \frac{D_{Cb}}{th_{e\_Cb}}\right)^d & D_{Cb} < th_{e\_Cb} \\ 0 & \text{otherwise,} \end{cases} \quad (4)$$

where, $D_{Cb}$ is a Cb chromaticity difference between a detected pixel and a current pixel, and $th_{e\_Cb}$ is a threshold value of a Cb chromaticity difference, d denoting a parameter related to a noise characteristic.

In this mode of implementation, $W_C$(x,y) may also be $W_{Cr}$(x,y), and the comparing module 522 may calculate $W_{Cr}$(x,y) by using formula (5) or (6) below:

$$W_{Cr}(x, y) = e^{-\frac{D_{Cr}^2}{sigma\_e^2}}, \quad (5)$$

$$W_{Cr}(x, y) = \begin{cases} \left(1 - \frac{D_{Cr}}{th_{e\_Cr}}\right)^4 & D_{Cr} < th_{e\_Cr} \\ 0 & \text{otherwise,} \end{cases} \quad (6)$$

where, $D_{Cr}$ is a Cr chromaticity difference between a detected pixel and a current pixel, and $th_{e\_Cr}$ is a threshold value of a Cr chromaticity difference, d denoting a parameter related to a noise characteristic.

In this embodiment, the central block is a block where a filtering center is located.

With the device of the embodiment of the present invention, a boundary of an object will not be crossed in filtering, and in removing noise, information on other objects will not be introduced to affect the result of filtering. And the size of a filtering window may be determined while filtering is performing, which may be carried out in one path, thereby avoiding time delay resulted from execution of two paths of a conventional method where an edge is detected first and then the size of a filtering window is determined.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, where the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may comprise the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

For the implementation of the present invention containing the above embodiments, following supplements are further disclosed.

Supplement 1. A filtering method, comprising:
a dividing step: dividing a first filtering window into a plurality of blocks;
a determining step: determining a filtering window area according to relevance between a central block and other non-central blocks in the plurality of blocks; and
a filtering step: performing filtering processing on an image in the determined filtering window area.

Supplement 2. The method according to supplement 1, wherein the plurality of blocks are of N×N arrangement or N×M arrangement, N and M being non-zero natural numbers.

Supplement 3. The method according to supplement 2, wherein in the plurality of blocks, two neighboring blocks have an overlapped area, or, two neighboring blocks have no overlapped area.

Supplement 4. The method according to supplement 2, wherein the determining step includes:
calculating a relevance parameter of each of the plurality of blocks;
comparing a relevance parameter of each of the non-central blocks in a predetermined direction of the central block with a relevance parameter of the central block, and determining whether the non-central blocks are related to the central block;
excluding non-central blocks of the rows and/or columns where boundary blocks are located and their peripheral non-central blocks from a range of the filtering window area by taking non-central blocks unrelated to the central block as the boundary blocks.

Supplement 5. The method according to supplement 4, wherein the predetermined direction includes four directions, the upper, the lower, the left and the right, of the central block, or the predetermined direction includes four directions, the upper right, the upper left, the lower left and the lower right, of the central block, or the predetermined direction includes four directions, the upper, the lower, the left and the right, of the central block, and four directions, the upper right, the upper left, the lower left and the lower right, of the central block.

Supplement 6. The method according to supplement 5, wherein,
if non-central blocks related to the central block are located in the four directions, the upper, the lower, the left and/or the right, of the central block, a rectangular area constituted by all the non-central blocks related to the central block is taken as the filtering window area;
if non-central blocks related to the central block are located in the four directions, the upper left, the upper right, the lower left and/or the lower right, of the central block, a triangular area constituted by all the non-central blocks related to the central block is taken as the filtering window area;
if non-central blocks related to the central block are located in at least one of the four directions, the upper, the lower, the left and the right, of the central block, and in at least one of the four directions, the upper left, the upper right, the lower left and/or the lower right, of the central block, a triangular area constituted by all the non-central blocks related to the central block is taken as the filtering window area.

Supplement 7. The method according to supplement 6, wherein if areas exceeding a predefined proportion in a non-central block fall within the triangular area, the non-central block is added into the filtering window area.

Supplement 8. The method according to supplement 4, wherein the relevance parameter is a mean value, and it is determined that a non-central block is unrelated to the central block if an absolute value of a difference between the mean value of the non-central block and the mean value of the central block is greater than a first threshold value.

Supplement 9. The method according to supplement 4, wherein the relevance parameter is standard deviation, and it is determined that a non-central block is unrelated to the central block if a difference between the standard deviation of the non-central block and the standard deviation of the central block is greater than a second threshold value.

Supplement 10. The method according to supplement 4, wherein the relevance parameter is histogram distribution, and it is determined that a non-central block is unrelated to the central block if the histogram distribution of the non-central block is different from the histogram distribution of the central block.

Supplement 11. The method according to supplement 4, wherein the relevance parameter is a sum of luminance weights of pixels, and it is determined that a non-central block is related to the central block if the sum of luminance weights of all the pixels of the non-central block and the sum of luminance weights of all the pixels of the central block satisfy following relation; otherwise it is determined that the non-central block is unrelated to the central block:

$b*\text{SUM}(W_Y(x,y))$ of the central block$<\text{SUM}(W_Y(x,y))$ of the non-central block$<c*\text{SUM}(W_Y(x,y))$ of the central block;

where, $W_Y(x, y)$ denotes a luminance weight of a pixel at a position (x,y), and $\text{SUM}(W_Y(x, y))$ denotes the sum of the luminance weights $W_Y(x, y)$ of all the pixels in the central block or the non-central block;

where, b and c are both proportion coefficients, b is less than or equal to 1, and c is greater than or equal to 1.

Supplement 12. The method according to supplement 11, $W_Y(x, y)$ may be calculated by using formula (1) or (2) below:

$$W_Y(x, y) = e^{-\frac{D_Y^2}{sigma\_e^2}}, \quad (1)$$

or, $$W_Y(x, y) = \begin{cases} \left(1 - \frac{D_Y}{th_{e\_Y}}\right)^d & D_Y < th_{e\_Y} \\ 0 & \text{otherwise;} \end{cases} \quad (2)$$

where, $D_y$ denotes an absolute value of a luminance difference between a detected pixel and a current pixel, $th_{e\_Y}$ denotes a threshold value of a luminance difference, and a denotes a parameter related to a characteristic of a noise curve.

Supplement 13. The method according to supplement 4, wherein the relevance parameter is a sum of color weights of pixels, and it is determined that a non-central block is related to the central block if the sum of color weights of all the pixels of the non-central block and the sum of color weights of all the pixels of the central block satisfy following relation; otherwise it is determined that the non-central block is unrelated to the central block:

$b*\text{SUM}(W_C(x,y))$ of the central block$<\text{SUM}(W_C(x,y))$ of the non-central block$<c*\text{SUM}(W_C(x,y))$ of the central block;

where, $W_C(x, y)$ denotes a color weight of a pixel at a position (x,y), and $\text{SUM}(W_C(x, y))$ denotes the sum of the color weights $W_C(x, y)$ of all the pixels in the central block or the non-central block;

where, b and c are both proportion coefficients, b is less than or equal to 1, and c is greater than or equal to 1.

Supplement 14. The method according to supplement 13, wherein $W_C(x,y)$ is $W_{Cb}(x,y)$, and $W_{Cb}(x,y)$ may be calculated by using a formula below:

$$W_{Cb}(x, y) = e^{-\frac{D_{Cb}^2}{sigma\_e^2}}$$

or, $$W_{Cb}(x, y) = \begin{cases} \left(1 - \frac{D_{Cb}}{th_{e\_Cb}}\right)^d & D_{Cb} < th_{e\_Cb} \\ 0 & \text{otherwise;} \end{cases}$$

where, $D_{Cb}$ is a Cb chromaticity difference between a detected pixel and a current pixel, and $th_{e\_Cb}$ is a threshold value of a Cb chromaticity difference, d denoting a parameter related to a noise characteristic.

Supplement 15. The method according to supplement 13, wherein $W_C(x,y)$ is $W_{Cr}(x,y)$, and $W_{Cr}(x,y)$ may be calculated by using a formula below:

$$W_{Cr}(x, y) = e^{-\frac{D_{Cr}^2}{sigma\_e^2}}$$

or, $$W_{Cr}(x, y) = \begin{cases} \left(1 - \frac{D_{Cr}}{th_{e\_Cr}}\right)^d & D_{Cr} < th_{e\_Cr} \\ 0 & \text{otherwise;} \end{cases}$$

where, $D_{Cr}$ is a Cr chromaticity difference between a detected pixel and a current pixel, and $th_{e\_Cr}$ is a threshold value of a Cr chromaticity difference, d denoting a parameter related to a noise characteristic.

Supplement 16. The method according to any one of supplements 1-15, wherein the central block is a block where a filtering center is located.

Supplement 17. A filtering device, comprising:
a dividing unit configured to divide a first filtering window into a plurality of blocks;
a determining unit configured to determine a filtering window area according to relevance between a central block and other non-central blocks in the plurality of blocks; and
a filtering unit configured to perform filtering processing on an image in the determined filtering window area.

Supplement 18. The device according to supplement 17, wherein the plurality of blocks are of N×N arrangement or N×M arrangement, N and M being non-zero natural numbers.

Supplement 19. The device according to supplement 18, wherein in the plurality of blocks, two neighboring blocks have an overlapped area, or, two neighboring blocks have no overlapped area.

Supplement 20. The device according to supplement 17, wherein the determining unit includes:
a calculating module configured to calculate a relevance parameter of each of the plurality of blocks;
a comparing module configured to compare a relevance parameter of each of the non-central blocks in a predetermined direction of the central block with a relevance parameter of the central block according to the result of calculation of the calculating module; and a determining module configured to determine whether the non-central blocks are related to the central block according to the result of comparison of the comparing module, and excluding non-central blocks of the rows and/or columns where boundary blocks are located and their peripheral non-central blocks from a range of the filtering window area by taking non-central blocks unrelated to the central block as the boundary blocks.

Supplement 21. The device according to supplement 20, wherein the predetermined direction includes four directions, the upper, the lower, the left and the right, of the central block, or the predetermined direction includes four directions, the upper right, the upper left, the lower left and the lower right, of the central block, or the predetermined direction includes four directions, the upper, the lower, the left and the right, of the central block, and four directions, the upper right, the upper left, the lower left and the lower right, of the central block.

Supplement 22. The device according to supplement 21, wherein, if non-central blocks related to the central block are located in the four directions, the upper, the lower, the left and/or the right, of the central block, a rectangular area constituted by all the non-central blocks related to the central block is taken as the filtering window area;

if non-central blocks related to the central block are located in the four directions, the upper left, the upper right, the lower left and/or the lower right, of the central block, a triangular area constituted by all the non-central blocks related to the central block is taken as the filtering window area;

if non-central blocks related to the central block are located in at least one of the four directions, the upper, the lower, the left and the right, of the central block, and in at least one of the four directions, the upper left, the upper right, the lower left and/or the lower right, of the central block, a triangular area constituted by all the non-central blocks related to the central block is taken as the filtering window area.

Supplement 23. The device according to supplement 22, wherein if areas exceeding a predefined proportion in a non-central block fall within the triangular area, the non-central block is added into the filtering window area.

Supplement 24. The device according to supplement 20, wherein the relevance parameter is a mean value, the comparing module compares a mean value of each of the non-central blocks in the predetermined direction of the central block with a mean value of the central block;

and the determining module determines that a non-central block is unrelated to the central block if an absolute value of a difference between the mean value of the non-central block and the mean value of the central block is greater than a first threshold value.

Supplement 25. The device according to supplement 20, wherein the relevance parameter is standard deviation, the comparing module compares standard deviation of each of the non-central blocks with standard deviation of the central block;

and the determining module determines that a non-central block is unrelated to the central block if a difference between the standard deviation of the non-central block and the standard deviation of the central block is greater than a second threshold value.

Supplement 26. The device according to supplement 20, wherein the relevance parameter is histogram distribution, the comparing module compares histogram distribution of each of the non-central blocks with histogram distribution of the central block;

and the determining module determines that a non-central block is unrelated to the central block if the histogram distribution of the non-central block is different from the histogram distribution of the central block.

Supplement 27. The device according to supplement 20, wherein the relevance parameter is a sum of luminance weights of pixels, the comparing module compares the sum of luminance weights of all the pixels of each of the non-central blocks with the sum of luminance weights of all the pixels of the central block to determine whether following relation is satisfied:

$b*\text{SUM}(W_Y(x,y))$ of the central block$<\text{SUM}(W_Y(x,y))$ of a non-central block$<c*\text{SUM}(W_Y(x,y))$ of the central block;

where, $W_Y(x, y)$ denotes a luminance weight of a pixel at a position (x,y), and $\text{SUM}(W_Y(x, y))$ denotes the sum of the luminance weights $W_Y(x, y)$ of all the pixels in the central block or the non-central block;

where, b and c are both proportion coefficients, b is less than or equal to 1, and c is greater than or equal to 1;

and the determining module determines that the non-central block is related to the central block if the result of comparison of the comparing module is that the above relation is satisfied; otherwise, the determining module determines that the non-central block is unrelated to the central block.

Supplement 28. The device according to supplement 27, wherein the comparing module calculates $W_Y(x, y)$ by using formula (1) or (2) below:

$$W_Y(x, y) = e^{-\frac{D_Y^2}{sigma-e^2}}, \quad (1)$$

or, $$W_Y(x, y) = \begin{cases} \left(1 - \frac{D_Y}{th_{e\_Y}}\right)^a & D_Y < th_{e\_Y} \\ 0 & \text{otherwise;} \end{cases} \quad (2)$$

where, $D_y$ denotes an absolute value of a luminance difference between a detected pixel and a current pixel, $th_{e\_Y}$ denotes a threshold value of a luminance difference, and a denotes a parameter related to a characteristic of a noise curve.

Supplement 29. The device according to supplement 20, wherein the relevance parameter is a sum of color weights of pixels, the comparing module compares the sum of color weights of all the pixels of each of the non-central blocks with the sum of color weights of all the pixels of the central block to determine whether following relation is satisfied:
$b*\text{SUM}(W_C(x, y))$ of the central block$<\text{SUM}(W_C(x, y))$ of a non-central block$<c*\text{SUM}(W_C(x, y))$ of the central block;

where, $W_C(x, y)$ denotes a color weight of a pixel at a position (x,y), and $\text{SUM}(W_C(x, y))$ denotes the sum of the color weights $W_C(x, y)$ of all the pixels in the central block or the non-central block;

where, b and c are both proportion coefficients, b is less than or equal to 1, and c is greater than or equal to 1;

and the determining module determines that the non-central block is related to the central block if the result of comparison of the comparing module is that the above relation is satisfied; otherwise, the determining module determines that the non-central block is unrelated to the central block.

Supplement 30. The device according to supplement 29, wherein $W_C(x, y)$ is $W_{Cb}(x,y)$, and the comparing module calculates $W_{Cb}(x,y)$ by using a formula below:

$$W_{Cb}(x, y) = e^{-\frac{D_{Cb}^2}{sigma\_e^2}}$$

or, $$W_{Cb}(x, y) = \begin{cases} \left(1 - \frac{D_{Cb}}{th_{e\_Cb}}\right)^d & D_{Cb} < th_{e\_Cb} \\ 0 & \text{otherwise;} \end{cases}$$

where, $D_{Cb}$ is a Cb chromaticity difference between a detected pixel and a current pixel, and $th_{e\_Cb}$ is a threshold value of a Cb chromaticity difference, d denoting a parameter related to a noise characteristic.

Supplement 31. The device according to supplement 29, wherein $W_C(x,y)$ is $W_{Cr}(x,y)$, and the comparing module calculates $W_{Cr}(x,y)$ by using a formula below:

$$W_{Cr}(x, y) = e^{-\frac{D_{Cr}^2}{sigma\_e^2}}$$

or, $$W_{Cr}(x, y) = \begin{cases} \left(1 - \frac{D_{Cr}}{th_{e\_Cr}}\right)^d & D_{Cr} < th_{e\_Cr} \\ 0 & \text{otherwise;} \end{cases}$$

where, $D_{Cr}$ is a Cr chromaticity difference between a detected pixel and a current pixel, and $th_{e\_Cr}$ is a threshold value of a Cr chromaticity difference, d denoting a parameter related to a noise characteristic.

Supplement 32. The device according to any one of supplements 17-31, wherein the central block is a block where a filtering center is located.

The invention claimed is:
1. A filtering device, comprising:
a dividing unit configured to divide a first filtering window into a plurality of blocks;
a determining unit configured to determine a filtering window area according to relevance between a central block and other non-central blocks in the plurality of blocks; and
a filtering unit configured to perform filtering processing on an image in the determined filtering window area;
wherein the determining unit comprises:
a calculating module configured to calculate a relevance parameter of each of the plurality of blocks;
a comparing module configured to compare a relevance parameter of each of the non-central blocks in a predetermined direction of the central block with a relevance parameter of the central block according to the result of calculation of the calculating module; and
a determining module configured to determine whether the non-central blocks are related to the central block according to the result of comparison of the comparing module, and excluding non-central blocks of rows and/or columns where boundary blocks are located and their peripheral non-central blocks from a range of the filtering window area by taking non-central blocks unrelated to the central block as the boundary blocks.

2. The device according to claim 1, wherein the plurality of blocks are of N×N arrangement or N×M arrangement, N and M being non-zero natural numbers.

3. The device according to claim 2, wherein in the plurality of blocks, two neighboring blocks have an overlapped area, or, two neighboring blocks have no overlapped area.

4. The device according to claim 1, wherein the predetermined direction includes four directions, the upper, the lower, the left and the right, of the central block, or the predetermined direction includes four directions, the upper right, the upper left, the lower left and the lower right, of the central block, or the predetermined direction includes four directions, the upper, the lower, the left and the right, of the central block, and four directions, the upper right, the upper left, the lower left and the lower right, of the central block.

5. The device according to claim 4, wherein,
if non-central blocks related to the central block are located in the four directions, the upper, the lower, the left and/or the right, of the central block, a rectangular area constituted by all the non-central blocks related to the central block is taken as the filtering window area;
if non-central blocks related to the central block are located in the four directions, the upper left, the upper right, the lower left and/or the lower right, of the central block, a triangular area constituted by all the non-central blocks related to the central block is taken as the filtering window area;
if non-central blocks related to the central block are located in at least one of the four directions, the upper, the lower, the left and the right, of the central block, and in at least one of the four directions, the upper left, the upper right, the lower left and/or the lower right, of the central block, a triangular area constituted by all the non-central blocks related to the central block is taken as the filtering window area.

6. The device according to claim 5, wherein if areas exceeding a predefined proportion in a non-central block fall within the triangular area, the non-central block is added into the filtering window area.

7. The device according to claim 1, wherein the relevance parameter is a mean value,
the comparing module compares a mean value of each of the non-central blocks in the predetermined direction of the central block with a mean value of the central block;
and the determining module determines that a non-central block is unrelated to the central block if an absolute value of a difference between the mean value of the non-central block and the mean value of the central block is greater than a first threshold value.

8. The device according to claim 1, wherein the relevance parameter is standard deviation,
the comparing module compares standard deviation of each of the non-central blocks with standard deviation of the central block;
and the determining module determines that a non-central block is unrelated to the central block if a difference between the standard deviation of the non-central block and the standard deviation of the central block is greater than a second threshold value.

9. The device according to claim 1, wherein the relevance parameter is histogram distribution,
the comparing module compares histogram distribution of each of the non-central blocks with histogram distribution of the central block;
and the determining module determines that a non-central block is unrelated to the central block if the histogram distribution of the non-central block is different from the histogram distribution of the central block.

10. The device according to claim 1, wherein the relevance parameter is a sum of luminance weights of pixels, the comparing module compares the sum of luminance weights of all the pixels of each of the non-central blocks with the sum of luminance weights of all the pixels of the central block to determine whether following relation is satisfied:

$b*\text{SUM}(W_Y(x,y))$ of the central block$<\text{SUM}(W_Y(x,y))$ of a non-central block$<c*\text{SUM}(W_Y(x,y))$ of the central block;

where, $W_Y(x, y)$ denotes a luminance weight of a pixel at a position (x,y), and $\text{SUM}(W_Y(x, y))$ denotes the sum of the luminance weights $W_Y(x, y)$ of all the pixels in the central block or the non-central block;

where, b and c are both proportion coefficients, b is less than or equal to 1, and c is greater than or equal to 1;

and the determining module determines that the non-central block is related to the central block if the result of comparison of the comparing module is that the above relation is satisfied; otherwise, the determining module determines that the non-central block is unrelated to the central block.

11. The device according to claim 10, wherein the comparing module calculates $W_Y(x, y)$ by using formula (1) or (2) below:

$$W_Y(x, y) = e^{-\frac{D_Y^2}{sigma\_e^2}}, \quad (1)$$

or, $$W_Y(x, y) = \begin{cases} \left(1 - \frac{D_Y}{th_{e\_Y}}\right)^a & D_Y < th_{e\_Y} \\ 0 & \text{otherwise,} \end{cases} \quad (2)$$

where, $D_y$ denotes an absolute value of a luminance difference between a detected pixel and a current pixel, $th_{e\_Y}$ denotes a threshold value of a luminance difference, and a denotes a parameter related to a characteristic of a noise curve.

12. The device according to claim 1, wherein the relevance parameter is a sum of color weights of pixels, the comparing module compares the sum of color weights of all the pixels of each of the non-central blocks with the sum of color weights of all the pixels of the central block to determine whether following relation is satisfied:

$b*\text{SUM}(W_C(x,y))$ of the central block$<\text{SUM}(W_C(x,y))$ of a non-central block$<c*\text{SUM}(W_C(x,y))$ of the central block;

where, $W_C(x, y)$ denotes a color weight of a pixel at a position (x,y), and $\text{SUM}(W_C(x, y))$ denotes the sum of the color weights $W_C(x, y)$ of all the pixels in the central block or the non-central block;

where, b and c are both proportion coefficients, b is less than or equal to 1, and c is greater than or equal to 1;

and the determining module determines that the non-central block is related to the central block if the result of comparison of the comparing module is that the above relation is satisfied; otherwise, the determining module determines that the non-central block is unrelated to the central block.

13. The device according to claim 12, wherein $W_C(x,y)$ is $W_{Cb}(x,y)$, and the comparing module calculates $W_{Cb}(x,y)$ by using a formula below:

$$W_{Cb}(x, y) = e^{-\frac{D_{Cb}^2}{sigma\_e^2}}$$

or, $$W_{Cb}(x, y) = \begin{cases} \left(1 - \frac{D_{Cb}}{th_{e\_Cb}}\right)^d & D_{Cb} < th_{e\_Cb} \\ 0 & \text{otherwise;} \end{cases}$$

where, $D_{Cb}$ is a Cb chromaticity difference between a detected pixel and a current pixel, and $th_{e\_Cb}$ is a threshold value of a Cb chromaticity difference, d denoting a parameter related to a noise characteristic.

14. The device according to claim 12, wherein $W_C(x,y)$ is $W_{Cr}(x,y)$, and the comparing module calculates $W_{Cr}(x,y)$ by using a formula below:

$$W_{Cr}(x, y) = e^{-\frac{D_{Cr}^2}{sigma\_e^2}}$$

or, $$W_{Cr}(x, y) = \begin{cases} \left(1 - \frac{D_{Cr}}{th_{e\_Cr}}\right)^d & D_{Cr} < th_{e\_Cr} \\ 0 & \text{otherwise;} \end{cases}$$

where, $D_{Cr}$ is a Cr chromaticity difference between a detected pixel and a current pixel, and $th_{e\_Cr}$ is a threshold value of a Cr chromaticity difference, d denoting a parameter related to a noise characteristic.

15. The device according to claim 1, wherein the central block is a block where a filtering center is located.

16. A filtering method, comprising:

a dividing step: dividing a first filtering window into a plurality of blocks;

a determining step: determining a filtering window area according to relevance between a central block and other non-central blocks in the plurality of blocks;

a filtering step: performing filtering processing on an image in the determined filtering window area;

wherein the determining step comprises:

calculating a relevance parameter of each of the plurality of blocks;

comparing a relevance parameter of each of the non-central blocks in a predetermined direction of the central block with a relevance parameter of the central block to determine whether the non-central blocks are related to the central block; and excluding non-central blocks of rows and/or columns where boundary blocks are located and their peripheral non-central blocks from a range of the filtering window area by taking non-central blocks unrelated to the central block as the boundary blocks.

17. The method according to claim 16 wherein the predetermined direction includes four directions, the upper, the lower, the left and the right, of the central block, or the predetermined direction includes four directions, the upper right, the upper left, the lower left and the lower right, of the central block, or the predetermined direction includes four directions, the upper, the lower, the left and the right, of the central block, and four directions, the upper right, the upper left, the lower left and the lower right, of the central block.

18. The method according to claim 16, wherein the central block is a block where a filtering center is located.

* * * * *